(12) United States Patent
Tsien et al.

(10) Patent No.: US 6,959,171 B2
(45) Date of Patent: Oct. 25, 2005

(54) DATA TRANSMISSION RATE CONTROL

(75) Inventors: Chih C. Tsien, San Diego, CA (US); Jiewen Liu, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 195 days.

(21) Appl. No.: 10/086,648

(22) Filed: Feb. 28, 2002

(65) Prior Publication Data

US 2003/0166394 A1 Sep. 4, 2003

(51) Int. Cl.[7] .............................................. H04B 17/00
(52) U.S. Cl. ................. 455/67.11; 455/522; 455/226.2; 455/226.3; 455/277.2; 455/278.1; 455/67.13; 455/135; 370/468
(58) Field of Search ............................... 455/517, 522, 455/226.2, 226.3, 277.2, 278.1, 67.11, 134, 135; 370/468

(56) References Cited

U.S. PATENT DOCUMENTS

| | | | | |
|---|---|---|---|---|
| 5,355,514 A | * | 10/1994 | Borg | 455/423 |
| 5,914,959 A | * | 6/1999 | Marchetto et al. | 370/468 |
| 6,553,075 B1 | * | 4/2003 | McGhee et al. | 375/254 |
| 6,594,495 B2 | * | 7/2003 | Salonaho et al. | 455/453 |
| 2002/0094048 A1 | * | 7/2002 | Simmons et al. | 375/362 |
| 2002/0105925 A1 | * | 8/2002 | Shoemake | 370/330 |
| 2003/0095506 A1 | * | 5/2003 | Jalali et al. | 370/252 |
| 2003/0112880 A1 | * | 6/2003 | Walton et al. | 375/260 |
| 2003/0194979 A1 | * | 10/2003 | Richards et al. | 455/216 |

FOREIGN PATENT DOCUMENTS

| | | |
|---|---|---|
| WO | WO 00/41318 | 7/2000 |

OTHER PUBLICATIONS

Al Jabri, A.K., et al., "Adaptive–rate transmission with coding and interleaving for a further improvement in the throughput of meteor–burst communication systems", *IEEE Military Communications Conference Proceedings*, vol. 2, pp. 391–396, Oct. 1998 (XP000830564).

Jacobsmeyer, J., "An adaptive modulation scheme for band-width–limited meteor–burst channels", *IEEE/Proceedings of the Military Communications Conference*, vol. 3, pp. 933–937, Oct. 1998 (XP000012361).

Kleider, J.E., et al., "An adaptive–rate anti–jam system for optimal voice communication", *IEEE/Milcom Conference Record*, vol. 3, pp. 1103–1107, Nov. 1997 (XP000749707).

* cited by examiner

*Primary Examiner*—Marceau Milord
(74) *Attorney, Agent, or Firm*—Fish & Richardson P.C.

(57) ABSTRACT

A method includes monitoring a variable-rate data communication channel to determine its signal-to-noise ratio, and adjusting the data transmission rate of the variable rate data communication channel based on its signal-to-noise ratio.

39 Claims, 5 Drawing Sheets

DATA TRANSMISSION RATE CONTROL

BACKGROUND

Wireless data communication is becoming increasingly popular and wireless data communication technology is being incorporated into numerous devices, such as cellular telephones, personal digital assistants, and wireless email devices, for example. Wireless data communication technology is also used in computer networks, thus allowing a user of a portable computer to move freely around an office, unencumbered by network wiring.

Two standard protocols for wireless data transmission are the IEEE 802.11a standard (IEEE std. 802.11a-1999, published December 1999) and the IEEE 802.11b standard (IEEE std. 802.11b-1999, published December 1999). Each of these protocols define multiple data transmission rates. IEEE 802.11a specifies a maximum transmission rate of 54 Mbits/s (megabits per second), with defined slower transmission rates of 48 Mbits/s, 36 Mbits/s, 24 Mbits/s, 18 Mbits/s, 12 Mbits/s, 9 Mbits/s, and 6 Mbits/s. IEEE 802.11b specifies a maximum transmission rate of 11 Mbits/s, with defined slower transmission rates of 5.5 Mbits/s, 2 Mbits/s, and 1 Mbit/s.

When maximum data throughput is desired, data is transferred at the highest data transmission rate available. Unfortunately, various factors, such as electrical interference, noise, and signal attenuation often limit that data transmission rate.

DETAILED DESCRIPTION

Figure 1:
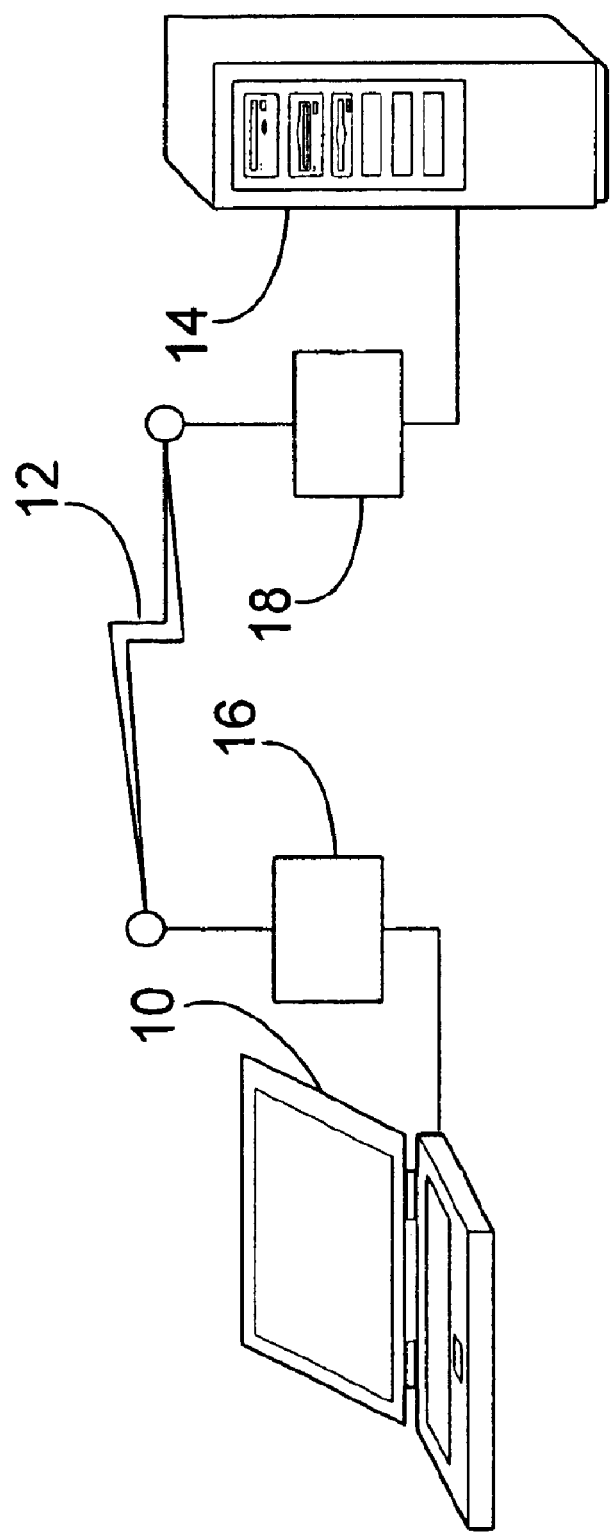
FIG. 1 shows a computer system using wireless data communication technology.

Computers and various hand-held devices, such as computers 10 and 14 shown in FIG. 1, communicate with each other via a variable-rate data communication channel 12. Each of these computers 10 and 14 use a wireless communication device 16 and 18 respectively to establish and maintain variable-rate data communication channel 12.

Wireless communication devices 16 and 18 monitor the signal-to-noise ratio (SNR) of variable-rate data communication channel 12 and adjust its data transmission rate in response to variations in the channel's signal-to-noise ratio. Specifically, the higher the signal to noise ratio, the higher the data transmission rate; and the lower the signal to noise ratio, the lower the data transmission rate.

Each wireless communication device 16 or 18 controls the rate at which that device transmits data across variable-rate data communication channel 12. Wireless communication device 16 controls the transmission rate that data is transmitted from computer 10 to computer 14 and wireless communication device 18 controls the transmission rate that data is transmitted from computer 14 to computer 10. Examples of these wireless communication devices are: wireless networking PCMCIA (Personal Computer Memory Card International Association) cards; wireless access points; wireless network interface cards; and so forth.

Figure 2:
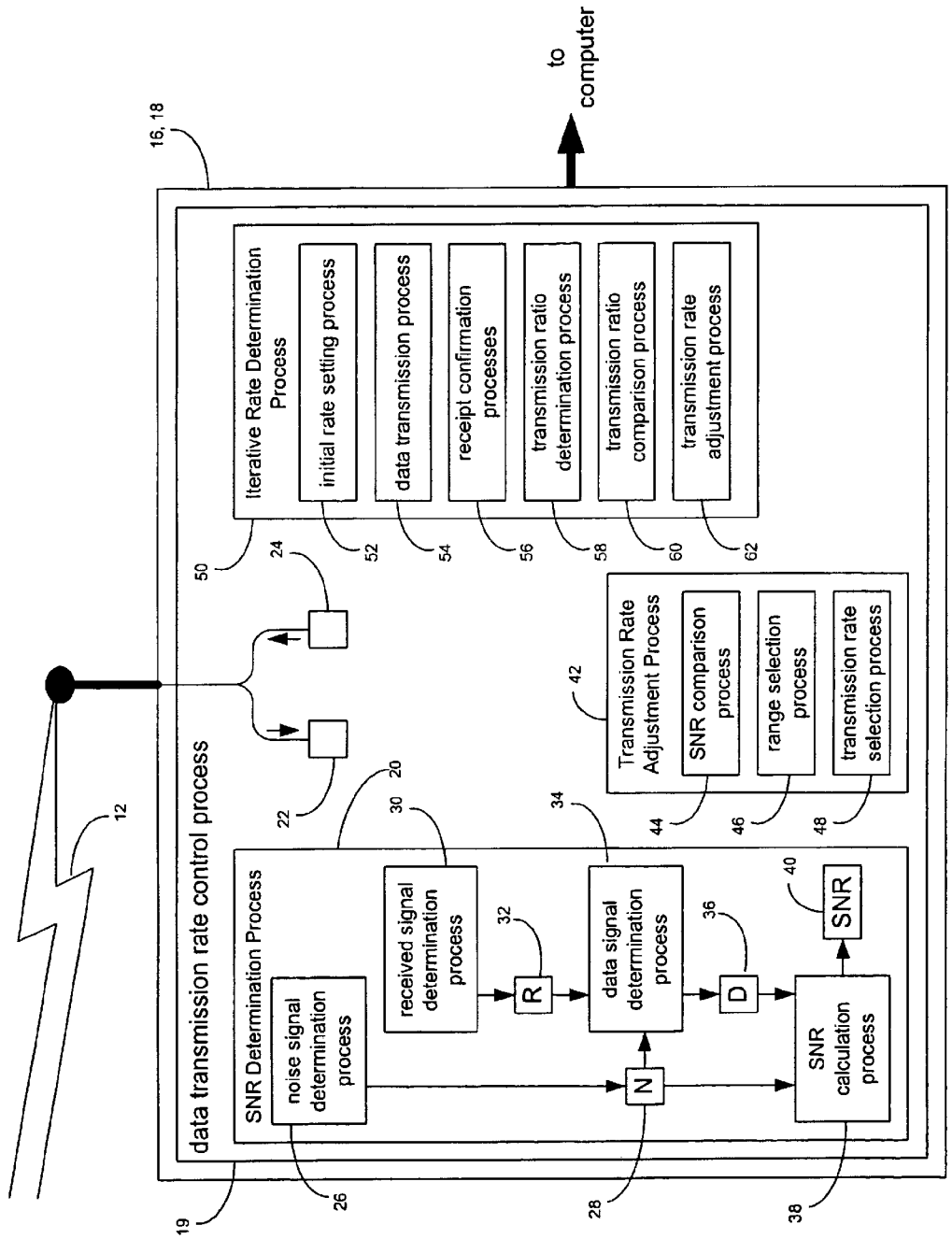
FIG. 2 shows a data transmission rate control process.

As shown in FIG. 2, each wireless communication device 16 or 18 includes a data transmission rate control process 19, which monitors the signal-to-noise ratio of variable-rate data communication channel 12 and adjusts its data transmission rate in response to variations in the channel's signal-to-noise ratio.

An SNR determination process 20 monitors the variable-rate data communication channel 12 to determine its signal-to-noise ratio. Variable-rate data communication channel 12 is a bidirectional channel that includes a receive side 22 and a transmit side 24. The receive side 22 is used for receiving data from other devices communicating on channel 12 and the transmit side 24 is used to transmit data to those devices.

SNR determination process 20 includes a noise signal determination process 26 that examines the receive side 22 of variable-rate data communication channel 12 to determine a noise signal strength factor 28 for the variable-rate data communication channel 12.

This noise signal strength factor 28 is determined by examining the strength of the signal present on the receive side 22 of communication channel 12 during a period of non-transmission. Ideally, in a system that has zero noise, the strength of the signal on the receive side 22 of channel 12 is zero during the periods when no data is being received from the remote device. Therefore, the strength of any signal present on channel 12 during a period of non-transmission represents the noise of the channel (i.e., its noise signal strength factor 28). This noise includes both air noise and receiver noise.

SNR determination process 20 also includes a received signal determination process 30 for examining, during a transmission period, the receive side 22 of channel 12 to determine a received signal strength factor 32.

This received signal strength factor 32 is measured during a time when data is being received from the remote device. Since received signal strength factor 32 represents the total signal strength during a transmission period (i.e., a period when data is being received from the remote device), this received signal strength factor 32 includes noise signal strength factor 28, as noise is present on channel 12 during both transmission and non-transmission periods.

SNR determination process 20 further includes a data signal determination process 34 for determining the difference between the received signal strength factor 32 (that represents data plus noise) and the noise signal strength factor 28 (that represents only noise). This difference is the data signal strength factor 36 and represents the strength of the actual data signal received.

Now that the strength of the data signal (i.e., the data signal strength factor 36) and the noise (i.e., the noise signal strength factor 28) on channel 12 have both been determined, the signal-to-noise ratio for variable-rate data communication channel 12 can be calculated.

SNR determination process 20 includes an SNR calculation process 38 for calculating the signal-to-noise ratio 40 of variable-rate data communication channel 12 from the data signal strength factor 36 and the noise signal strength factor 28.

Mathematically, the signal-to-noise ratio (SNR) is equal to:

$$20 \log_{10}(V_s/V_n).$$

Accordingly, if the data signal strength factor 36 (as determined by data signal determination process 34) is four millivolts (4 mV), and the noise signal strength factor 28 (as determined by noise signal determination process 26) is one millivolt (1 mV), the signal-to-noise ratio 40 of channel 12 is:

$$20 \log_{10}(0.004/0.001).$$

Therefore, in this example, the signal-to-noise ratio for channel 12 is 12.04 decibels. This signal-to-noise ratio 40, as determined by SNR calculation process 38, is used to set the data transmission rate of channel 12.

Data transmission rate control process 19 includes a transmission rate adjustment process 42 that uses the signal-to-noise ratio 40 calculated by SNR calculation process 38 to adjust the data transmission rate of variable-rate data communication channel 12.

The transmission rate adjustment process 42 includes an SNR comparison process 44 for comparing the signal-to-noise ratio 40 of the variable-rate data communication channel 12 to multiple signal-to-noise ratio ranges. An example of these signal-to-noise ratio ranges (for an IEEE 802.11a protocol channel) is shown below:

|     | Data Transmission Rate | Minimum Signal-to-Noise Ratio |
| --- | --- | --- |
| (1) | 6 Mbit/s  | 1.2 dB  |
| (2) | 9 Mbit/s  | 3.8 dB  |
| (3) | 12 Mbit/s | 4.4 dB  |
| (4) | 18 Mbit/s | 7.0 dB  |
| (5) | 24 Mbit/s | 10.1 dB |
| (6) | 36 Mbit/s | 13.1 dB |
| (7) | 48 Mbit/s | 17.7 dB |
| (8) | 54 Mbit/s | 19.0 dB |

For each range in the above-listed table, a minimum acceptable signal-to-noise ratio is specified, which defines the lowest acceptable signal-to-noise for that particular data transmission rate. For example, since the first three ranges are 1.2 dB, 3.8 dB, and 4.4 dB, if a signal-to-noise ratio of 3.1 dB is calculated, the data transmission rate would be set to 6 MBits per second, since this calculated signal-to-noise ratio meets the minimum requirements of the first range but not the second range.

The above-listed signal-to-noise ratio ranges are for illustrative purposes only and can be tailored to address the specific communication needs of the computers communicating, the wireless communication devices, the communication channel, the wireless communication protocol (e.g., IEEE 802.11a), and so forth.

While the above table lists ranges that include only a minimum acceptable signal-to-noise ratio, this is for illustrative purposes only. Specifically, each range can actually include both a minimum acceptable signal-to-noise ratio and a maximum acceptable signal-to-noise ratio (which is just below the minimum acceptable signal-to-noise ratio of the next higher transmission rate.

An example of these signal-to-noise ratio ranges (for an IEEE 802.11a protocol channel) is shown below:

|     | Data Transmission Rate | Signal-to-Noise Ratio Range |
| --- | --- | --- |
| (1) | 6 Mbit/s  | 1.2~3.7 dB |
| (2) | 9 Mbit/s  | 3.8~4.3 dB |
| (3) | 12 Mbit/s | 4.4~6.9 dB |
| (4) | 18 Mbit/s | 7.0~10 dB  |
| (5) | 24 Mbit/s | 10.1~13 dB |
| (6) | 36 Mbit/s | 13.1~17.6 dB |
| (7) | 48 Mbit/s | 17.7~18.9 dB |
| (8) | 54 Mbit/s | 19 dB and above |

Continuing with the above-stated example, the calculated signal-to-noise ratio 40 (i.e., 12.04 dB), as determined by SNR calculation process 38, is compared to the above-listed signal-to-noise ratio ranges, each of which has a specific data transmission rate associated with it.

A range selection process 46, included in transmission rate adjustment process 42, selects the signal-to-noise ratio range that encompasses the signal-to-noise ratio 40 calculated by SNR calculation process 38. For the above-stated example, the calculated signal-to-noise ratio is 12.04 dB and, therefore, the signal-to-noise ratio range that range selection process 46 selects is the fifth range (i.e., 10.1~13 dB). This signal-to-noise ratio range has a data transmission rate of 24 Mb per second associated with it.

Once the appropriate signal-to-noise ratio range is selected, a transmission rate selection process 48 adjusts the data transmission rate of the variable-rate data communication channel 12 to the transmission rate specified for that particular signal-to-noise ratio range. In the above-stated example having a signal-to-noise ratio of 12.04 dB, the appropriate data transmission rate is 24 Mb per second. Accordingly, the transmit side 24 of variable-rate data communication channel 12 will transmit data to the remote device it is communicating with at a data transmission rate of 24 Mb per second.

As explained above, the calculation of the signal-to-noise ratio 40 of communication channel 12 is a prerequisite to setting the channel's data transmission rate. Therefore, if the SNR determination process 20 cannot determine the channel's signal-to-noise ratio 40 within a defined time period (e.g., 2 seconds), an iterative rate determination process 50 is available (as a supplementary determination process) to set that channel's data transmission rate. Various situations can cause the SNR determination process 20 to be unable to determine the signal-to-noise ratio of channel 12, such as a lost connection, or channel interference.

The iterative rate determination process 50 includes an initial rate setting process 52 for setting the data transmission rate of variable-rate data communication channel 12 to the data transmission rate that corresponds to the last-determined signal-to-noise ratio. Continuing with the above-stated example, since the last calculated signal-to-noise ratio was 12.04 db, the data transmission rate was last set by transmission rate selection process 48 to 24 Mb per second. Assuming that the signal-to-noise ratio is temporarily unavailable for channel 12, initial rate setting process 52 will set the data transmission rate of channel 12 to (or, in other words, maintain it at) 24 Mb per second.

Once the transmission rate of channel 12 is set, any time a packet of data needs to be transmitted to the remote device, a data transmission process 54 transmits that data packet at the current transmission rate, which in this example is 24 Mb per second.

Whenever data packets are transferred to a remote device (via the transmit side 24 of channel 12), upon successfully receiving that data packet, the remote device transmits a confirmation to the sender of the packet acknowledging that it received the data packet successfully. In the event that the data packet is not received or is received corrupted, a confirmation will not be sent.

A receipt confirmation process 56 monitors the receipt of these confirmations (on the receive side 22 of channel 12) to determine if the data packets transmitted to the remote device were actually received. A transmission ratio determination process 58, which is responsive to receipt confirmation process 56, determines a transmission ratio for communication channel 12. This transmission ratio is equal to the number of packets successfully received by the remote device (as determined by receipt confirmation process 56) versus the number of data packets transmitted by data transmission process 54. For example, if 2,700 packets of data were transmitted to the remote device and only 1,163 were received, the transmission ratio is 43.07%.

As stated above, this iterative rate determination process 50 may be used when the signal-to-noise ratio 40 of channel 12 cannot be determined by SNR determination process 20 for a defined period of time. Iterative rate determination process 50 is configured to monitor the amount of time since the signal-to-noise ratio was last successfully calculated and, if it has been longer than the defined period of time (typically 2 seconds), iterative rate determination process 50 may be used as a supplemental rate determination process. Further, since the transmission rate of channel 12 is initially set (by initial rate setting process 52) to the last SNR-determined data transmission rate, it is possible that this transmission rate will need to be readjusted by looking at the transmission ratio determined by transmission ratio determination process 58. In the event that the transmission rate is too high (with respect to the level of noise present on the channel), the transmission ratio will be too low. Conversely, in the event that the transmission rate is too low (with respect to the level of noise present on the channel), the transmission ratio will be too high.

Accordingly, a transmission ratio comparison process 60 compares the transmission ratio determined by transmission ratio determination process 58 to a defined acceptability ratio range (e.g., 50–90%). While 50% and 90% are typical values that define the defined acceptability ratio range, these values can be raised or lowered to meet specific design requirements. Typically, the lower end of the range (e.g., 50%) defines the point at which the transmission ratio is so low that communication on the channel is unreliable. At this point, the transmission rate should be lowered to the next lower rate. Conversely, the upper end of the range (e.g., 90%) defines the point at which the transmission ratio is so high that communication on the channel is very reliable. At this point, the transmission rate can be raised to the next higher rate.

In the event that the calculated transmission ratio is outside of this defined acceptability ratio range, a transmission rate adjustment process 62 will either raise or lower the transmission rate one step to the next available transmission rate. At this point, a new transmission ratio will be calculated for channel 12 and again compared to the defined acceptability ratio range to determine if additional adjustment is required. If the new transmission ratio is acceptable (i.e., it falls within the defined acceptability ratio range), data will continue to be transmitted at the current transmission rate. However, if the transmission ratio is still either above or below the defined acceptability ratio range, the transmission rate will once again be adjusted. The following table specifies the available transmission rates for the IEEE 802.11(a) protocol:

| IEEE 802.11(a) |
| --- |
| 54.0 Mbits/second |
| 48.0 Mbits/second |
| 36.0 Mbits/second |
| 24.0 Mbits/second |
| 18.0 Mbits/second |
| 12.0 Mbits/second |
| 9.0 Mbits/second |
| 6.0 Mbits/second |

This repetitive adjustment (i.e., raising and/or lowering) of the transmission rate will continue until an acceptable transmission ratio is achieved.

Continuing with the above-stated example, the protocol used is IEEE 802.11(a) and the current transmission rate is 36 Mb per second. If, as stated above, only 1,163 of 2,700 packets were received by the remote device, the transmission ratio would be 43.07%. This falls below the minimum required level (i.e., 50%) of the defined acceptability ratio range. Therefore, since we are below this minimum required level, the data transmission rate will be adjusted downward (by transmission rate adjustment process 62) from 36 Mb per second to 24 Mb per second. Once the transmission rate is lowered, data packets are transmitted to the remote device and transmission ratio determination process 58 again determines a transmission ratio for this lower transmission rate. Let's say, for example, that out of 2,700 packets of data transferred, 1,369 were successfully received by the remote device. The amounts to a transmission ratio of 50.70%. Since this transmission ratio is within the defined acceptability ratio range of 50–90%, the transmission rate will be maintained at 24 Mb per second.

As long as the signal-to-noise ratio continues to be unavailable, this checking and rechecking of the transmission ratio will continue and adjustments to the data transmission rate, if needed, will be made. For example, if a transmission ratio of 92.40% is subsequently calculated for the channel (which is currently communicating at 24 Mb per second), this falls above the maximum required level (i.e., 90%) of the defined acceptability ratio range. Therefore, since we are above the maximum required level, the data transmission rate will be adjusted upward (by transmission rate adjustment process 62) from 24 Mb per second to 36 Mb per second.

If the signal-to-noise ratio continues to be unavailable for an extended period of time (e.g., 10 seconds), the data transmission rate is reduced to the lowest available rate so that the communication channel connection can be reestablished. Data transmission rate control process 19 is also configured to monitor the amount of time since the signal-to-noise ratio was last successfully calculated so that if it is longer than the extended period of time, the data transmission rate will be reduced to the lowest available rate in order to reestablish the connection.

Further, since the preferred method of setting the data transmission rate of channel 12 is based on the calculation of the signal-to-noise ratio, SNR determination process 20 continuously tries to calculate the signal-to-noise ratio of channel 12. In the event that the signal-to-noise ratio 40 of channel 12 is successfully calculated, the transmission rate of channel 12 will once again be set based on its signal-to-noise ratio.

Figure 2A:
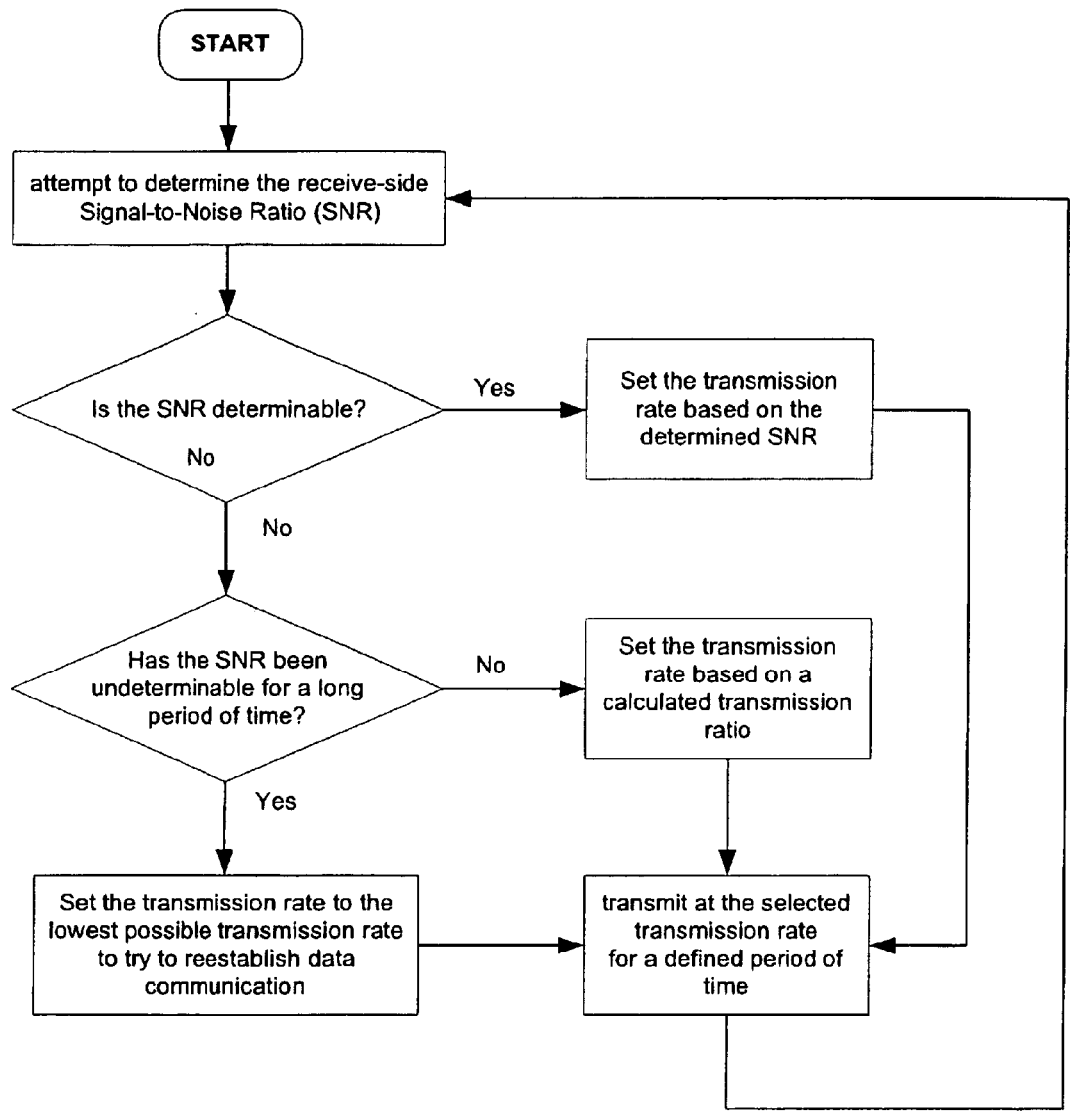
FIG. 2A shows a flow chart exemplifying one embodiment of the data transmission rate control process.

Referring to FIG. 2A, there is shown a flowchart that exemplifies one embodiment of the above-described process.

Figure 3:
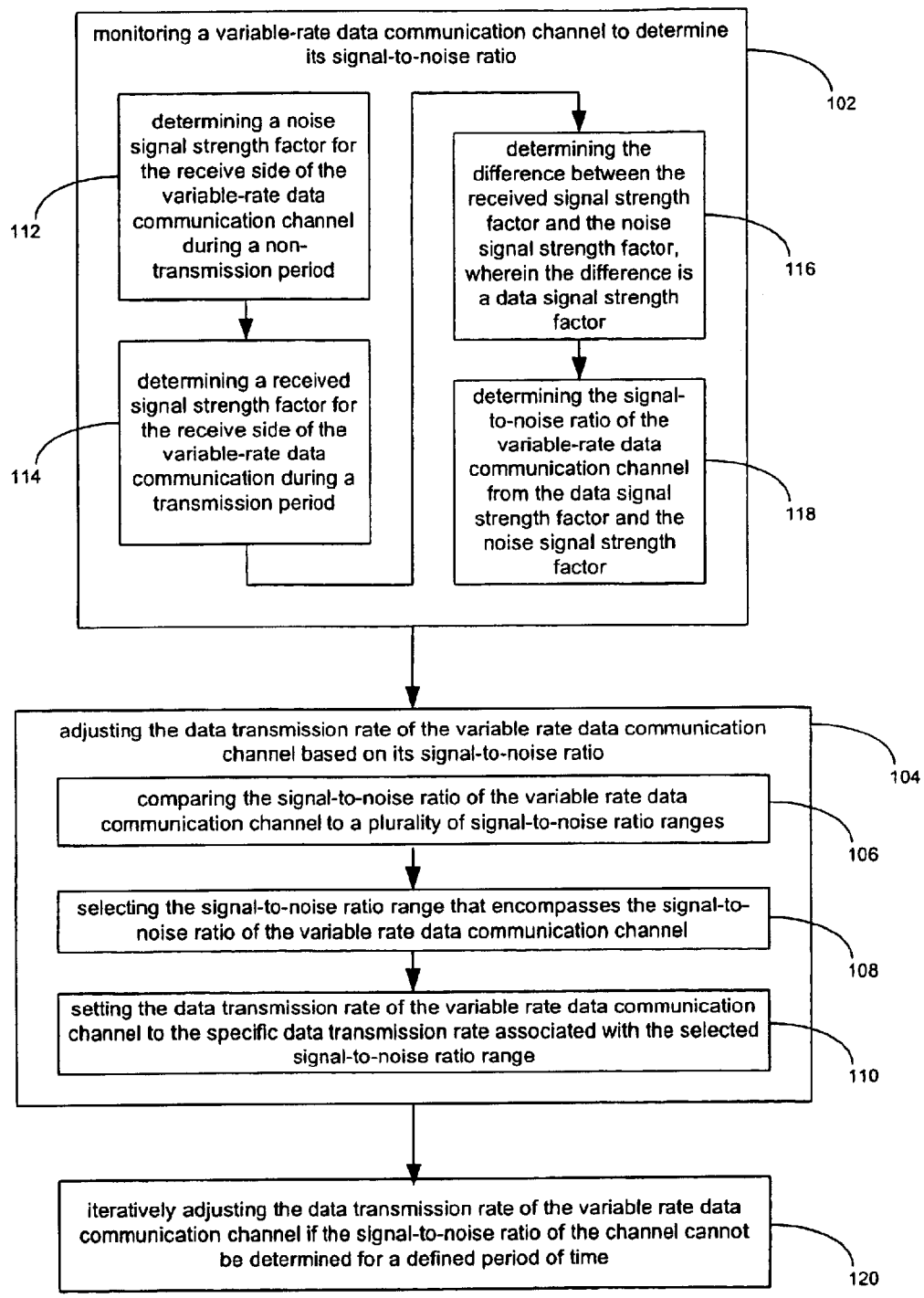
FIG. 3 shows a data transmission rate control method.

Referring to FIG. 3, there is shown a data transmission rate adjustment method 100. A variable-rate data communication channel is monitored 102 to determine its signal-to-noise ratio. The data transmission rate of the variable rate data communication channel is adjusted 104 based on its signal-to-noise ratio.

Adjusting 104 the data transmission rate includes comparing 106 the signal-to-noise ratio of the variable rate data communication channel to various signal-to-noise ratio ranges, and selecting 108 the signal-to-noise ratio range that encompasses the signal-to-noise ratio of the variable rate data communication channel.

Since each signal-to-noise ratio range is associated with a specific data transmission rate, the data transmission rate of the variable rate data communication channel can now be set 110 to the specific data transmission rate associated with the selected signal-to-noise ratio range.

Monitoring 102 a variable-rate data communication channel includes determining 112 a noise signal strength factor for the receive side of the variable-rate data communication channel during a non-transmission period. Monitoring 102 a variable-rate data communication channel also includes determining 114 a received signal strength factor for the receive side of the variable-rate data communication during a transmission period, and determining 116 the difference between the received signal strength factor and the noise signal strength factor. This difference is a data signal strength factor.

Monitoring 102 a variable-rate data communication channel further includes determining 118 the signal-to-noise ratio of the variable-rate data communication channel from the data signal strength factor and the noise signal strength factor.

Method 100 includes iteratively adjusting 120 the data transmission rate of the variable rate data communication channel if the signal-to-noise ratio of the channel cannot be determined for a defined period of time.

Figure 4:
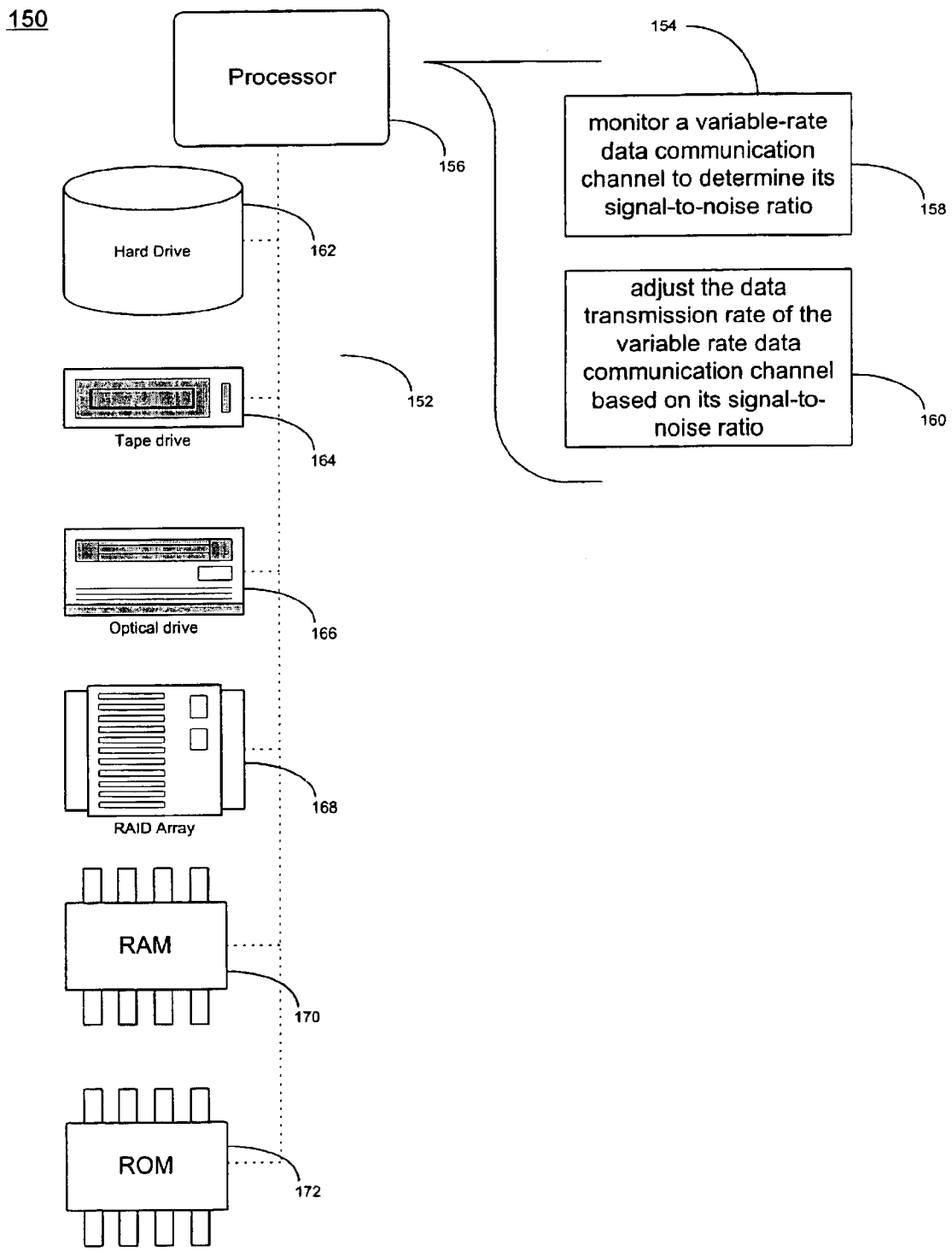
FIG. 4 shows another data transmission rate control process.

Referring to FIG. 4, there is shown a computer program product 150 that resides on a computer system. Computer program product 150 includes a computer readable medium 152 that stores instructions 154 that, when executed by a processor 156, cause that processor 156 to monitor 158 a variable-rate data communication channel to determine its signal-to-noise ratio. Computer program product 150 adjusts 160 the data transmission rate of the variable rate data communication channel based on its signal-to-noise ratio.

Typical embodiments of computer readable medium 152 are: hard disk drive 162, tape drive 164; optical drive 166; RAID array 168; random access memory 170; and read only memory 172.

Other embodiments are within the scope of the following claims.

What is claimed is:

1. A method comprising:
    monitoring a variable-rate data communication channel to determine its signal-to-noise ratio; and
    iteratively adjusting the data transmission rate of the variable rate data communication channel if the signal-to-noise ratio of the communication channel cannot be determined for a defined period of time.

2. The method of claim 1 wherein said adjusting the data transmission rate includes comparing the signal-to-noise ratio of the variable-rate data communication channel to a plurality of signal-to-noise ratio ranges.

3. The method of claim 2 wherein said adjusting the data transmission rate further includes selecting the signal-to-noise ratio range that encompasses the signal-to-noise ratio of the variable rate data communication channel.

4. The method of claim 3 wherein each signal-to-noise ratio range is associated with a specific data transmission rate, said adjusting the data transmission rate further includes setting the data transmission rate of the variable rate data communication channel to the specific data transmission rate associated with the selected signal-to-noise ratio range.

5. The method of claim 1 wherein the variable rate data communication channel is a bidirectional channel that includes a receive side for receiving data from a remote device and a transmit side for transmitting data to that remote device, said monitoring a variable-rate data communication channel includes determining a noise signal strength factor for the receive side of the variable-rate data communication channel during a non-transmission period.

6. The method of claim 5 wherein monitoring a variable-rate data communication channel includes determining a received signal strength factor for the receive side of the variable-rate data communication during a transmission period.

7. The method of claim 6 wherein monitoring a variable-rate data communication channel includes determining the difference between the received signal strength factor and the noise signal strength factor, wherein the difference is a data signal strength factor.

8. The method of claim 6 wherein monitoring a variable-rate data communication channel includes determining the signal-to-noise ratio of the variable-rate data communication channel from the data signal strength factor and the noise signal strength factor.

9. The method of claim 1 further comprising adjusting the data transmission rate of the variable rate data communication channel based on its signal-to-noise ratio.

10. A data transmission rate control process comprising:
    an SNR determination process for monitoring a variable-rate data communication channel during a non-transmission period to determine its signal-to-noise ratio; and
    an iterative rate determination process, responsive to said SNR determination process being unable to determine the signal-to-noise ratio of said variable-rate data communication channel for a defined period of time, for setting the data transmission rate of said variable rate data communication channel.

11. The date transmission rate control process of claim 10 wherein said transmission rate adjustment process includes an SNR comparison process for comparing the signal-to-noise ratio of the variable rate data communication channel to a plurality of signal-to-noise ratio ranges.

12. The data transmission rate control process of claim 11 wherein said transmission rate adjustment process further includes a range selection process for selecting a signal-to-noise ratio range that encompasses the signal-to-noise ratio of the variable rate data communication channel.

13. The data transmission rate control process of claim 12 wherein each said signal-to-noise ratio range is associated with a specific data transmission rate, said transmission rate adjustment process further including a transmission rate selection process for setting the data transmission rate of said variable rate data communication channel to the specific data transmission rate associated pith the selected signal-to-noise ratio range.

14. The data transmission rate control process of claim 10 wherein said variable rate data communication channel is a bidirectional channel that includes a receive side for receiving data from a remote device and a transmit side for transmitting data to that remote device, said SNR determination process including a noise signal determination process for determining a noise signal strength factor for said receive side of said variable-rate data communication channel.

15. The date transmission rate control process of claim 14 wherein said SNR determination process includes a received signal determination process for determining a received signal strength factor for said receive side of said variable-rate data communication channel during a transmission period.

16. The data transmission rate control process of claim 15 wherein said SNR determination process includes a data signal determination process for determining the difference between said received signal strength factor and said noise signal strength factor, wherein said difference is a data signal strength factor.

17. The data transmission rate control process of claim 16 wherein said SNR determination process includes a SNR calculation process for determining said signal-to-noise ratio of said variable-rate data communication channel from said actual signal strength factor and said noise signal strength factor.

18. The data transmission rate control process of claim 10 wherein said variable-rate data communication channel can transmit data at a plurality of data transmission rates, said iterative rate determination process including an initial rate setting process for setting the data transmission rate of said variable-rate data communication channel to the data transmission rate that corresponds to the last-determined signal-to-noise ratio.

19. The data transmission rate control process of claim 18 wherein said iterative rate determination process includes:
 a data transmission process for transmitting data packets, via said variable-rate data communication channel, to a remote device; and
 a receipt confirmation process for determining if said data packets transmitted to said remote device were received by said remote device.

20. The data transmission rate control process of claim 19 wherein said iterative rate determination process includes a transmission ratio determination process for determining a transmission ratio, wherein said transmission ratio is indicative of the ratio of data packets received by the remote device versus data packets transmitted to the remote device.

21. The data transmission rate control process of claim 20 wherein said iterative rate determination process includes:
 a transmission ratio comparison process for comparing said transmission ratio to a defined acceptability ratio range; and
 a transmission rate adjustment process for adjusting the transmission rate of said variable-rate data communication channel in response to said transmission ratio being outside of said defined acceptability ratio range.

22. The process of claim 10 further comprising a transmission rate adjustment process, responsive to said SNR determination process, for adjusting the data transmission rate of said variable rate data communication channel based on its signal-to-noise ratio.

23. A computer program product residing on a computer readable medium having instructions stored thereon which, when executed by the processor, cause that processor to:
 monitor a variable-rate data a communication channel during a non-transmission period to determine its signal-to-noise ratio; and
 iteratively adjust the data transmission rate of the variable-rate data communication channel if the signal-to-noise ratio of the communication channel cannot be determined for a defined period of time.

24. The computer program product of claim 23 wherein said computer readable medium is a read-only memory.

25. The computer program product of claim 23 further comprising instructions to cause the machine to adjust the data transmission rate of the variable rate data communication channel based on its signal-to-noise ratio.

26. A data transmission rate control system comprising:
 a first computing device including a first wireless communication system;
 a second computing device including a second wireless communication system, wherein said first and second wireless communication systems form a variable rate data communication channel between said first and second computing devices;
 wherein each said wireless communication system includes:
 a SNR determination process for monitoring said variable-rate data communication channel during a non-transmission period to determine its signal-to-noise ratio; and
 an iterative rate determination process, responsive to said SNR determination process being unable to determine the signal-to-noise ratio of said variable-rate data communication channel for a defined period of time, for setting the data transmission rate of said variable rate data communication channel.

27. The data transmission rate control system of claim 26 wherein said transmission rate adjustment process includes:
 a SNR comparison process for comparing the signal-to-noise ratio of said variable rate data communication channel to a plurality of signal-to-noise ratio ranges; and
 a range selection process or selecting a signal-to-noise ratio range that encompasses the signal-to-noise ratio of said variable rate data communication channel.

28. The data transmission rate control system of claim 27 wherein each said signal-to-noise ratio range is associated with a specific data transmission rate, said transmission rate adjustment process further including a transmission rate selection process for setting the data transmission rate of said variable rate data communication channel to the specific data transmission rate associated with the selected signal-to-noise ratio range.

29. The data transmission rate control system of claim 28 wherein said variable rate data communication channel is a bidirectional channel that includes a receive side for receiving data from a remote device and a transmit side for transmitting data to that remote device, said SNR determination process including a noise signal determination process for determining a noise signal strength factor for said receive side of said variable-rate data communication channel.

30. The data transmission rate control system of claim 29 wherein said SNR determination process includes:
 a received signal determination process for determining a received signal strength factor for said receive side of said variable-rate data communication channel during a transmission period; and
 a data signal determination process for determining the difference between said received signal strength factor and said noise signal strength factor, wherein said difference is a data signal strength factor.

31. The data transmission rate control system of claim 30 wherein said SNR determination process includes an SNR calculation process for determining said signal-to-noise ratio of said variable-rate data communication channel from said actual signal strength factor and said noise signal strength factor.

32. The control system of claim 26 further comprising a transmission rate adjustment profess, responsive to said SNR determination process, for adjusting the data transmission rate of said variable rate data communication channel based on its signal-to-noise ratio.

33. A method comprising:
monitoring a variable-rate data bidirectional communication channel during a non-transmission period to determine its signal-to-noise ratio; the bidirectional channel including a receive side for receiving data from a remote device and a transmit side for transmitting data to that remote device, and
iteratively adjusting the data transmission rate of the variable rate data communication channel if the signal-to-noise ratio of the communication channel cannot be determined.

34. The method of claim 33 further comprising adjusting the data transmission rate of the variable rate data communication channel based on its signal-to-noise ratio.

35. A method comprising:
monitoring a variable-rate data communication channel during a non-transmission period to determine its signal-to-noise ratio; and
iteratively adjusting the data transmission rate of the variable rate data communication channel if the signal-to-noise ratio of the channel cannot be determined for a defined period of time.

36. The method of claim 35 wherein monitoring a variable-rate data communication channel includes determining a received signal strength factor for the receive side of the variable-rate data communication during a transmission period.

37. The method of claim 35 further comprising adjusting the data transmission rate of the variable rate data communication channel based on its signal-to-noise ratio if the signal-to-noise ratio of the channel can be determined.

38. The method of claim 37 wherein said adjusting the data transmission rate includes comparing the signal-to-noise ratio of the variable-rate data communication channel to a plurality of signal-to-noise ratio ranges.

39. A method comprising:
monitoring a variable-rate data communication channel to determine its signal-to-noise ratio; and
iteratively adjusting the data transmission rate of the variable rate data communication channel if the signal-to-noise ratio of the communication channel cannot be monitored for a defined period of time.

* * * * *